Jan. 5, 1954          G. C. SCHAEFER          2,665,177
FIFTH WHEEL FOR TRACTOR TRAILERS AND THE LIKE
Filed Oct. 15, 1952
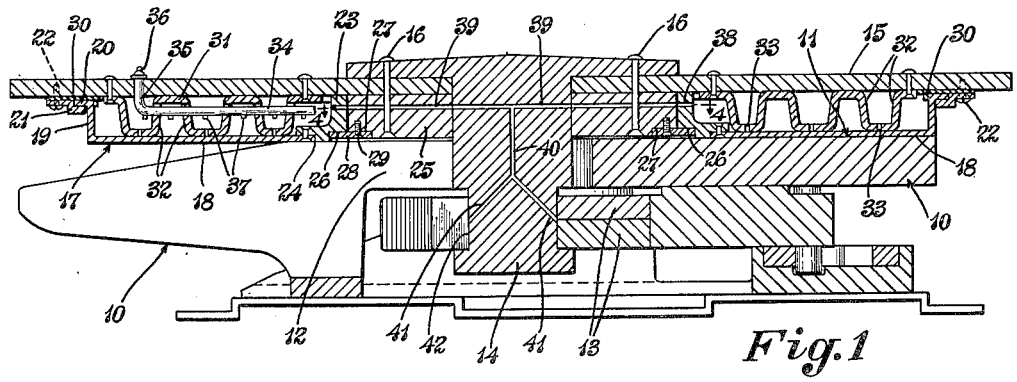
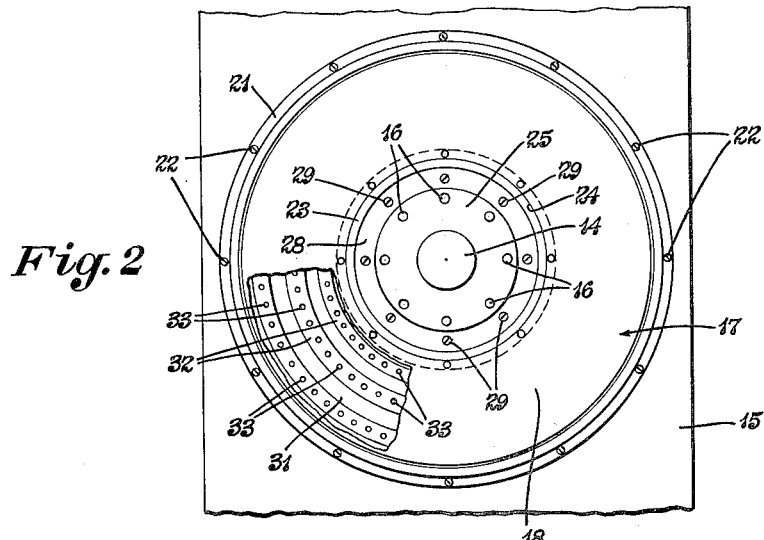
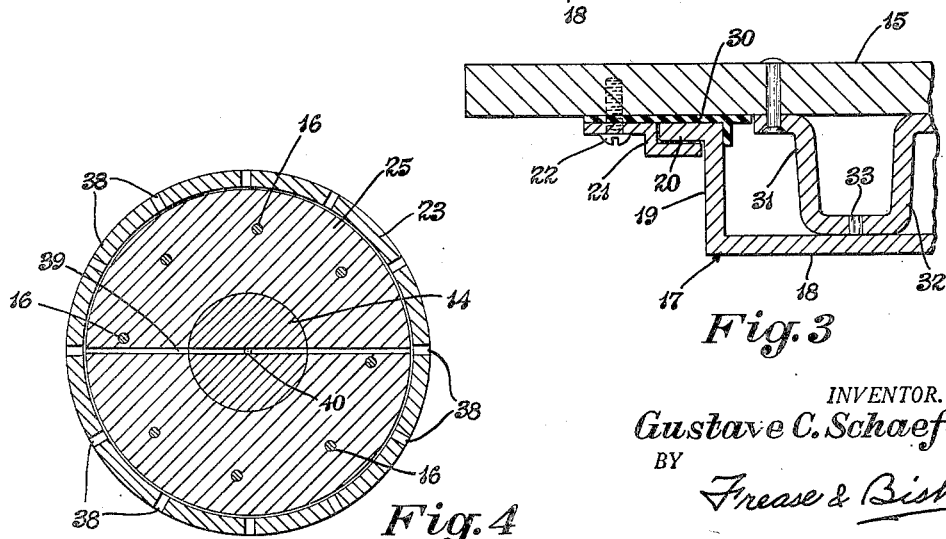
INVENTOR.
Gustave C. Schaefer
BY
Frease & Bishop
ATTORNEYS Patented Jan. 5, 1954

2,665,177

UNITED STATES PATENT OFFICE 2,665,177

FIFTH WHEEL FOR TRACTOR TRAILERS AND THE LIKE

Gustave C. Schaefer, Canton, Ohio

Application October 15, 1952, Serial No. 314,799

6 Claims. (Cl. 308—136)

The invention relates to fifth wheels such as are used as a exible connection between a self propelled vehicle, such as a tractor or truck, and a trailer, or other drawn vehicle, and more particularly to the construction of the upper member of the fifth wheel providing means for lubricating the same, and this application is a continuation in part of my copending application, Serial No. 209,462, filed February 5, 1951.

The usual flexible connection provided between a tractor and trailer, and the like, comprises a fifth wheel, including a lower fifth wheel member carried by the tractor, or truck, and an upper fifth wheel member, carried by the trailer, and including a king pin adapted to be received in the lower fifth wheel member in order to flexibly couple the tractor, or truck, and trailer together.

The present invention is concerned only with the construction of the upper fifth wheel member, carried by the trailer, or other drawn vehicle, the same being constructed so as to cooperate with the conventional lower fifth wheel member, carried by the tractor, or other driving vehicle.

Under present practice the upper fifth wheel member comprises generally a flat plate, having a centrally located king pin depending therefrom and adapted to be engaged in the usual notch in the lower fifth wheel member, the opposed flat surfaces of the upper and lower fifth wheel members being in frictional contact with each other.

In an attempt to reduce the friction, it is customary to cover the two contacting flat surfaces of the upper and lower fifth wheel members with heavy grease, but the weight of the trailer, or other drawn vehicle, especially when carrying heavy loads, and the friction caused by rotation of the two members relative to each other, causes this grease to be extremely thinned in texture and to be squeezed out from between the two contacting surfaces of the fifth wheel members, so that in a short time the lubricant is entirely dissipated and the two fifth wheel members become quickly worn from intermittent relative movement of the two substantially dry surfaces as the vehicle goes around corners, curves and the like, on streets and highways.

The present invention contemplates a novel construction of upper fifth wheel member, to be carried by the trailer or other drawn vehicle, having means for lubricating the same so as to prevent excessive wear between the upper and lower fifth wheel members.

Another object is to provide an upper fifth wheel member adapted to cooperate with, and to be coupled to, the conventional lower fifth wheel member such as is now in general use upon tractors, trucks and the like.

A further object is to provide an upper fifth wheel member in the form of a turntable, or fifth wheel lubricator, having an annular housing, or lubricant retainer, rotatably mounted upon the usual plate of the upper fifth wheel member, which plate carries the king pin, whereby, when the parts of the fifth wheel are coupled together the annular housing, or lubricant retainer, of the upper fifth wheel member will rest upon the flat upper surface of the conventional lower fifth wheel member and will not rotate relative thereto, but will permit the plate, carrying the king pin, to rotate relative to the annular housing, or lubricant retainer, as the vehicle goes around corners, or curves, lubrication being provided between the two relatively movable parts of the upper fifth wheel member to prevent excessive wear.

A still further object is to provide such an upper fifth wheel member in which an annularly corrugated disc plate is fixed to the upper plate thereof and located within the rotatable housing or lubricant retainer.

Another object is to provide an upper fifth wheel member of the type referred to in which the corrugated plate has a multiplicity of apertures therein for the passage of lubricant.

A further object is to provide an upper fifth wheel member in which the rotatable housing has a flat bottom wall with a hub opening at its center, through which is journalled a boss fixed upon the underside of the upper fifth wheel plate, the king pin being located through said boss.

A still further object is to provide a flange retaining ring for rotatably mounting the annular lubricant housing upon the underside of the top plate, concentric with the king pin.

It is also an object of the invention to provide means for conveying lubricant from the rotatable, annular, lubricant housing, through passages in the king pin, to the exterior of the king pin within the notch of the lower fifth wheel member in which the king pin is rotatably located.

Another object of the present improvement is to provide a sealing means between the rotatable annular housing, the upper plate and the flange retaining ring, to prevent lubricant from leaking from the housing.

The above objects together with others which will be apparent from the drawing and following description, or which may be later referred to, may be attained by constructing the improved fifth wheel in the manner hereinafter described in detail, and illustrated in the accompanying drawing, in which;

Fig. 1 is a vertical, sectional view through the improved upper fifth wheel member, showing the same coupled to a conventional lower fifth wheel member;

Fig. 2 a smaller scale bottom plan view of the upper fifth wheel member, with parts broken away;

Fig. 3 an enlarged, fragmentary, vertical, sectional view through one end portion of the rotatable housing, a lubricant container, and adjacent portion of the plate of the upper fifth wheel member, showing a portion of the corrugated disc plate; and, Fig. 4 a horizontal, sectional view through the king pin and the surrounding boss of the upper fifth wheel plate, and the hub of the rotatable annular housing or lubricant container, taken as on the line 4—4, Fig. 1.

Referring now more particularly to the construction illustrated in the accompanying drawing, in which similar numerals refer to similar parts throughout, the lower fifth wheel member, as indicated generally at 10, may be of any usual and conventional form having the flat horizontal upper surface 11, the rearwardly disposed V-shape notch 12, extending substantially to the center thereof, and the usual locking jaws 13 for latching the king pin 14 of the upper fifth wheel member, as in usual and well known practice.

The invention is concerned only with the novel and improved construction of the upper fifth wheel member, which comprises the usual upper plate 15, connected in usual and well known manner to the trailer, or other drawn vehicle, and having the king pin 14 rigidly secured thereto, as by rivets 16, the king pin depending from the upper plate, as in usual and well known practice.

An important feature of the improved construction of upper fifth wheel member is the rotatable, annular housing, or lubricant retainer, indicated generally at 17, having a flat, horizontal, bottom surface 18, adapted to contact and rest upon the flat top surface 11 of the lower fifth wheel member.

The rotatable annular housing, or lubricant retainer 17 has the annular side wall 19, with outturned peripheral flange 20 at its upper edge, and is rotatably mounted upon the underside of the plate 15, as by the flange retaining ring 21, connected to the underside of the plate 15, as by a plurality of screws 22, or the like.

A central hub 23 is integrally formed upon, or rigidly connected to, the central opening 24 of the rotatable annular housing 18, and surrounds the depending boss 25, which is fastened to the underside of the upper fifth wheel plate 15, as by the rivets 16, and surrounds the king pin 14.

The hub 23 and boss 25 may be annularly grooved, as at 26 and 27 respectively, to receive the retaining ring 28, which is fixed to the boss 25 as by the screws 29, so that the lubricant housing 17 is rotatably supported upon the rings 21 and 28.

For the purpose of preventing the escape of lubricant around the periphery of the rotatable lubricant housing 17, an annular seal is provided. This seal may be in the form of a flanged, rubber ring 30, located between the flange 20 of the housing 17, the flanged retaining ring 21, and the upper plate 15, as shown in detail in Fig. 3.

An annularly corrugated disc plate 31 is attached to the underside of the upper fifth wheel plate 15, and located within the rotatable lubricant housing 17. This disc plate 31 is provided with a plurality of concentric corrugations 32 of sufficient depth to contact the bottom wall 18 of the housing 17, and the bottom wall of each corrugation is provided with a plurality of apertures 33, to permit lubricant to freely pass therethrough.

For the purpose of admitting lubricating oil to the rotatable housing 17, an oil pipe 34 may be located radially through the upper portion of the corrugated disc plate 31, as indicated in Fig. 1, the outer angular end 35 of said pipe being located through the upper fifth wheel plate 15 and provided with any conventional grease or oil fitting, as indicated at 36, for admitting oil to the pipe.

A plurality of jets or apertures 37 are provided in the pipe 34 for discharging oil into the rotatable lubricant housing 17 for substantially filling the same with oil. In order to lubricate the king pin 14, within the notch 12 of the lower fifth wheel member, a plurality of radial openings 38 may be provided in the hub 23 and adapted to successively communicate with radial passages 39 located through the boss 25 and king pin 14.

These radial passages communicate with a vertical passage 40 in the center of the king pin, which in turn communicates with the downwardly inclined radial passages 41, extending to the exterior of the reduced portion 42 of the king pin, so as to lubricate the same within the lower fifth wheel member.

With this construction the entire weight of the load upon the upper fifth wheel plate 15 is transmitted through the corrugated disc plate 31 and bottom wall 18 of the rotatable lubricant housing 17, to the flat upper surface 11 of the lower fifth wheel member 10.

The rotatable lubricant housing 17 will thus rest upon the flat upper surface of the lower fifth wheel member and will not rotate relative thereto, but permits the upper plate 15, carrying the king pin, to rotate relative to the housing 17, as the vehicle goes around corners and curves, the corrugated disc plate 31 rotating upon the bottom wall 18 of the lubricant housing, lubrication being provided by these two relatively movable parts of the upper fifth wheel to prevent excessive wear.

From the above it will be apparent than an improved fifth wheel construction is thus produced, in which proper lubrication may be maintained between the moving parts of the fifth wheel so as to reduce friction and wear to a minimum, as compared with the conventional type of fifth wheel now in general use.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation and use of preferred embodiments thereof, and the advantageous new and useful results obtained thereby; the new and useful constructions, and reasonable mechanical equivalents thereof obvious to those

I claim:

1. An upper fifth wheel member for detachable connection to a lower fifth wheel member having a substantially flat top surface, said upper fifth wheel member comprising a substantially horizontal plate, a king pin fixed to said plate and depending therefrom for detachable connection to the lower fifth wheel member, an annular lubricating housing, means rotatably mounting said housing upon the underside of said horizontal plate concentric with the king pin, said housing having a flat bottom wall adapted to contact the flat top surface of the lower fifth wheel member, a disc plate fixed to the underside of the horizontal plate within the housing, and annular corrugations in the disc plate concentric with the king pin and contacting the bottom wall of the housing.

2. An upper fifth wheel member for detachable connection to a lower fifth wheel member having a substantially flat top surface, said upper fifth wheel member comprising a substantially horizontal plate, a king pin fixed to said plate and depending therefrom for detachable connection to the lower fifth wheel member, an annular lubricating housing, means rotatably mounting said housing upon the underside of said horizontal plate concentric with the king pin, said housing having a flat bottom wall adapted to contact the flat top surface of the lower fifth wheel member, a disc plate fixed to the underside of the horizontal plate within the housing, and annular corrugations in the disc plate concentric with the king pin and contacting the bottom wall of the housing, there being a plurality of apertures in said corrugations.

3. An upper fifth wheel member for detachable connection to a lower fifth wheel member having a substantially flat top surface, said upper fifth wheel member comprising a substantially horizontal plate, a king pin fixed to said plate and depending therefrom for detachable connection to the lower fifth wheel member, an annular lubricating housing, means rotatably mounting said housing upon the underside of said horizontal plate concentric with the king pin, said housing having a flat bottom wall adapted to contact the flat top surface of the lower fifth wheel member, a disc plate fixed to the underside of the horizontal plate within the housing, annular corrugations in the disc plate concentric with the king pin and contacting the bottom wall of the housing, and a lubricant pipe within the housing and located horizontally through said corrugations and provided with openings.

4. An upper fifth wheel member for detachable connection to a lower fifth wheel member having a substantially flat top surface, said upper fifth wheel member comprising a substantially horizontal plate, a king pin fixed to said plate and depending therefrom for detachable connection to the lower fifth wheel member, a boss upon the underside of said plate surrounding the king pin, an annular lubricating housing, means rotatably mounting said housing upon the underside of said horizontal plate, concentric with the king pin, said means comprising an annular flange retaining ring fixed to the underside of said plate, an annular flange upon the periphery of the housing and rotatably mounted upon said ring, and a ring fixed to the underside of said boss and rotatably supporting the central portion of the housing, said housing having a flat bottom wall adapted to contact the flat top surface of the lower fifth wheel member, a disc plate fixed to the underside of the horizontal plate within the housing, and annular corrugations in the disc plate concentric with the king pin and contacting the bottom wall of the housing.

5. An upper fifth wheel member for detachable connection to a lower fifth wheel member having a substantially flat top surface, said upper fifth wheel member comprising a substantially horizontal plate, a king pin fixed to said plate and depending therefrom for detachable connection to the lower fifth wheel member, a boss upon the underside of said plate surrounding the king pin, an annular lubricating housing, means rotatably mounting said housing upon the underside of said horizontal plate concentric with the king pin, said housing having a flat bottom wall adapted to contact the flat top surface of the lower fifth wheel member, a cylindrical hub fixed to the central portion of the housing and surrounding said boss, a disc plate fixed to the underside of the horizontal plate within the housing, and annular corrugations in the disc plate concentric with the king pin and contacting the bottom wall of the housing.

6. An upper fifth wheel member for detachable connection to a lower fifth wheel member having a substantially flat top surface, said upper fifth wheel member comprising a substantially horizontal plate, a king pin fixed to said plate and depending therefrom for detachable connection to the lower fifth wheel member, a boss upon the underside of said plate surrounding the king pin, an annular lubricating housing, means rotatably mounting said housing upon the underside of said horizontal plate concentric with the king pin, said means comprising an annular flange retaining ring fixed to the underside of said plate, an annular flange upon the periphery of the housing and rotatably mounted upon said ring, and a ring fixed to the underside of said boss and rotatably supporting the central portion of the housing, said housing having a flat bottom wall adapted to contact the flat top surface of the lower fifth wheel member, a cylindrical hub fixed to the central portion of the housing and surrounding said boss, a disc plate fixed to the underside of the horizontal plate within the housing, and annular corrugations in the disc plate concentric with the king pin and contacting the bottom wall of the housing.

GUSTAVE C. SCHAEFER.

References Cited in the file of this patent

UNITED STATES PATENTS

| Number | Name | Date |
| --- | --- | --- |
| 599,150 | Reilly | Feb. 15, 1898 |
| 2,481,695 | Scott | Sept. 13, 1949 |